(12) United States Patent
Ligeret et al.

(10) Patent No.: US 9,986,418 B2
(45) Date of Patent: *May 29, 2018

(54) DETERMINING A SERVICE LEAKAGE RATE WITHIN A WIRELESS COMMUNICATION NETWORK

(71) Applicant: T-Mobile USA, Inc., Bellevue, WA (US)

(72) Inventors: Xavier Ligeret, Seattle, WA (US); Hui-Hsia Sung, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/458,313

(22) Filed: Mar. 14, 2017

(65) Prior Publication Data

US 2017/0188225 A1    Jun. 29, 2017

Related U.S. Application Data

(63) Continuation of application No. 14/984,196, filed on Dec. 30, 2015, now Pat. No. 9,615,242.

(60) Provisional application No. 62/189,403, filed on Jul. 7, 2015.

(51) Int. Cl.
*H04W 8/18*    (2009.01)
*H04W 24/08*   (2009.01)

(52) U.S. Cl.
CPC ............. *H04W 8/18* (2013.01); *H04W 24/08* (2013.01)

(58) Field of Classification Search
CPC ....... H04W 8/18; H04W 60/00; H04W 60/02; H04W 8/06; H04W 8/183; H04W 76/028; H04W 76/02; H04B 7/0417

USPC .......... 455/435.1, 522, 575.1, 299, 69, 3.01, 455/108, 118; 370/230
See application file for complete search history.

(56) References Cited

U.S. PATENT DOCUMENTS

| 6,119,012 | A | 9/2000 | Amirijoo |
| 9,026,110 | B1 | 5/2015 | Nehme Antoun et al. |
| 9,615,242 | B2 | 4/2017 | Ligeret |
| 2004/0057378 | A1 | 3/2004 | Gronberg |
| 2009/0203326 | A1 | 8/2009 | Vesma et al. |
| 2011/0273986 | A1 | 11/2011 | Le Rouzic et al. |
| 2012/0077473 | A1 | 3/2012 | Suzuki et al. |

(Continued)

OTHER PUBLICATIONS

Office Action for U.S. Appl. No. 15/203,612,dated Jul. 12, 2017, Ligeret et al., "Determining Quality of Providing Network Services by a Wireless Communication Network", 15 pages.

(Continued)

*Primary Examiner* — Cong Tran
(74) *Attorney, Agent, or Firm* — Lee & Hayes, PLLC

(57) ABSTRACT

A method of determining a network leakage rate within a wireless communication network that uses counters within an application server. The number of users at a second point in time, determined by the counters, is subtracted from a number of users at a first point in time, determined by the counters, to provide a first result. The number of user attempts to access the network, determined by the counters, is multiplied by a success rate and then the number of users leaving the network (de-registering from the network or handing off to a different network) is subtracted to provide a second result. The second result is subtracted from the first result and then divided by the number of users at the first point in time. The absolute value is the network leakage rate.

20 Claims, 2 Drawing Sheets

(56) References Cited

U.S. PATENT DOCUMENTS

| | | |
|---|---|---|
| 2013/0090132 A1 | 4/2013 | Terada et al. |
| 2013/0143563 A1 | 6/2013 | Singh et al. |
| 2015/0006259 A1 | 1/2015 | Yoo et al. |
| 2015/0126236 A1 | 5/2015 | Mukherjee et al. |
| 2016/0084875 A1 | 3/2016 | Aoki |
| 2016/0337495 A1 | 11/2016 | Akita |
| 2017/0013439 A1 | 1/2017 | Ligeret et al. |

OTHER PUBLICATIONS

Office Action for U.S. Appl. No. 15/203,612, dated Dec. 22, 2017, Ligeret et al., "Determining Quality of Providing Network Services by a Wireless Communication Network", 17 pages.

DETERMINING A SERVICE LEAKAGE RATE WITHIN A WIRELESS COMMUNICATION NETWORK

CROSS-REFERENCE TO RELATED APPLICATION

The present disclosure is a continuation of and claims priority to U.S. patent application Ser. No. 14/984,196, filed Dec. 30, 2015, now U.S. Pat. No. 9,615,242, issued Apr. 4, 2017, which is related to and claims priority from U.S. Provisional Patent Application No. 62/189,403, filed Jul. 7, 2015, which are incorporated herein by reference.

BACKGROUND

In recent years, telecommunication devices have advanced from offering simple voice calling services within wireless networks to providing users with many new features. Telecommunication devices now provide messaging services such as email, text messaging, and instant messaging; data services such as Internet browsing; media services such as storing and playing a library of favorite songs; location services; and many others. In addition to the new features provided by the telecommunication devices, users of such telecommunication devices have greatly increased. Such an increase in users is only expected to continue and in fact, it is expected that there could be a growth rate of twenty times more users in the next few years alone. Such an increase in wireless traffic implies more demand and less radio resource availability, which likely leads to the degradation of the wireless network performance.

Operators of wireless networks generally use success rate key performance indicators (KPIs) to measure the performance in their wireless networks. However, often KPIs do not capture the "health" or "quality" of the wireless network, such as, for example, the network or service leakage, i.e., the number of users involuntarily disconnected or "dropped" from the wireless network. For example, current methods to calculate network leakage include call detail records or charging data records (CDRs). However, CDRs generally have a high cost for processing and analysis due to the amount of data in the CDRs. Additionally, the CDRs do not provide for real time network health status and are generally less accurate. Finally, the cost associated with using CDRs grows exponentially as you increase the granularity, e.g., going from an hourly time interval to a 15-minute interval.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
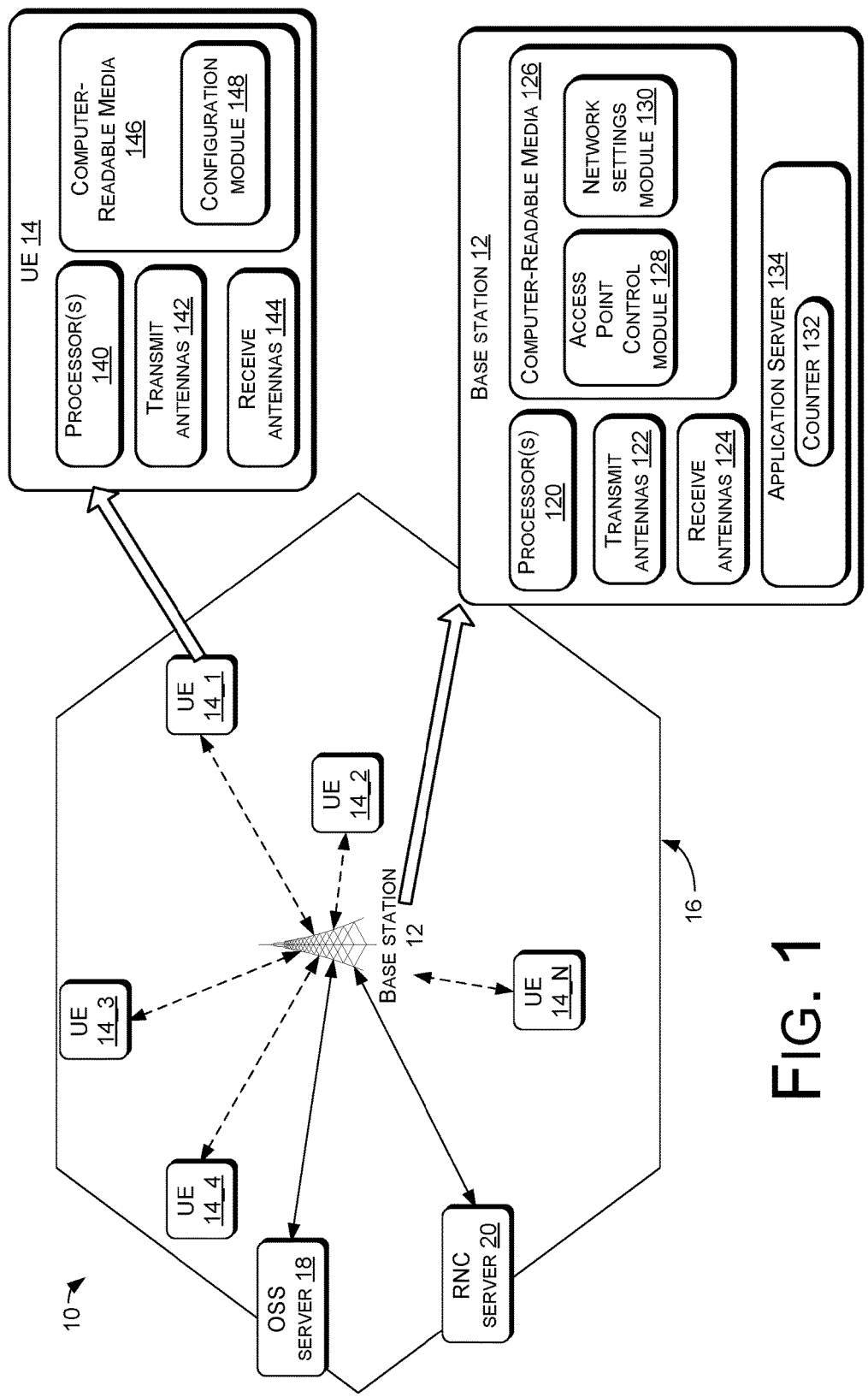
FIG. 1 illustrates a wireless communication network, in accordance with various embodiments.

Described herein is a wireless communication network that includes architecture for calculating a network or service leakage rate based upon various factors such as, for example, users on the network, attempted access to the network and attempted exit from the wireless communication network. For example, an application server, either located within the wireless communication network or separately therefrom, includes counters that count the number of users currently on the wireless communication network. The counters can also keep count of the number of users that attempt to access the wireless communication network and the number of users that attempt to exit the wireless communication network.

In an embodiment, at a first point in time, the number of users on the wireless communication network is determined using the counters. At a second point in time, the number of users on the wireless communication network is again determined using the counters. During the time period between the first point in time and the second point in time, the counters also determine the number of user attempts to access the wireless communication network and the number of users that were successful in accessing the wireless communication network. Finally, the counters also determine a number of users that attempted to exit the wireless communication network.

In order to determine the leakage rate, the number of users at the second point in time is subtracted from the numbers of users at the first point in time to provide a first result. The number of user initial attempts that attempted to access the wireless communication network is multiplied by a success rate (where the success rate is the number of successful initial registration attempts between the second point in time and the first point in time divided by the number of user initial registration attempts between the second point in time and the first point in time; the number of successful initial registrations can be defined as the number of positive responses sent back by the network to the subscribers' initial registration requests) and then the number of users leaving the network (de-registering from the network or handing off to a different network) is subtracted to provide a second result. The second result is subtracted from the first result and then divided by the number of users at the first point in time. The absolute value provided by this formula is the leakage rate. Note that initial registration attempts distinguish from "refresh" registration attempts. For example, in an IMS network the users who are already registered on the IMS network send "refresh register" on a regular basis (time interval is dictated by the network), similarly to a "keep alive" procedure, whereas the "initial register" is the procedure to connect the users (who are not already registered on the IMS network) to the IMS network The leakage rate formula assumes that the wireless communication network does not create duplicate subscribers for the subscribers who have lost connection and then reconnect to the network. The formula also assumes that the counters keeping track of the various numbers are accurate. The result of the formula should be zero, which indicates that there is no change in the network or no leakage. Otherwise, the formula should produce a negative value, i.e., the value of the formula should be less than zero (hence the absolute value of the formula is used as the network leakage rate). If the result of the formula is above zero, then this indicates that there is an issue with the counters.

FIG. 1 illustrates a wireless communication network 10 (also referred to herein as network 10). The network 10 comprises a base station (BS) 12 communicatively coupled to a plurality of user devices, referred to as UEs 14_1, 14_2, ..., 14_N, where N is an appropriate integer. The BS 12 serves UEs 14 located within a geographical area, e.g., within a macro cell 16. FIG. 1 illustrates the macro cell 16 to be hexagonal in shape, although other shapes of the macro cell 16 may also be possible. In general, the network 10 comprises a plurality of macro cells 16, with each macro cell 16 including one or more Bs 12.

In an embodiment, the UEs 14_1, ..., 14_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, and/or the like. As such, UEs 14_1, ..., 14_N may range widely in terms of capabilities and features. For example, one of the UEs 14_1, ..., 14_N may have a numeric keypad, a capability to display only a few lines of text and be configured to interoperate with only Global System for Mobile Communications (GSM) networks. However, another of the UEs 14_1, ..., 14_N (e.g., a smart phone) may have a touch-sensitive screen, a stylus, an embedded GPS receiver, and a relatively high-resolution display, and be configured to interoperate with multiple types of networks. UEs 14_1, ..., 14_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 12 may communicate voice traffic and/or data traffic with one or more of the UEs 14_1, ..., 14_N. The BS 12 may communicate with the UEs 14_1, ..., 14_N using one or more appropriate wireless communication protocols or standards. For example, the BS 12 may communicate with the UEs 14_1, ..., 14_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 12 may be communicatively coupled (e.g., using a backhaul connection, illustrated using solid lines in FIG. 1) to a number of backhaul equipment, e.g., an operation support subsystem (OSS) server 18, a radio network controller (RNC) 20, and/or the like. The RNC 20 can also be in the form of a mobility management entity when the wireless communication network 10 operates according to the long term evolution (LTE) standard or LTE Advanced standard.

In an embodiment, the base station 12 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 12 can also be in the form of a Node B (where the wireless communication network 10 is 3G UMTS network) or in the form of an eNode B (where the wireless communication network 10 operates according to the LTE standard or LTE Advanced standard).

The one or more transmit antennas 122 may transmit signals to the UEs 14_1, ..., 14_N, and the one or more receive antennas 124 may receive signals from the UEs 14_1, ..., 14_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 12.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 12. The computer-readable media 126 may reside within the base station 12, on one or more storage devices accessible on a local network to the base station 12, on cloud storage accessible via a wide area network to the base station 12, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 12 storing the access point control module 128 and the network settings module 130, in various other embodiments, the access point control module 128, the network settings module 130, and one or more other modules (not illustrated, may be stored in another component of the network 10 (e.g., other than the BS 12). For example, one or more of these modules may be stored in a computer-readable media included in the OSS server 18, the RNC 20, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 12 may comprise several other components, e.g., a power bus configured to supply power to various components of the base station 12, one or more interfaces to communicate with various backhaul equipment, and/or the like.

In an embodiment, the UEs 14 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 12, and the one or more receive antennas 144 may receive signals from the base station 12. In an embodiment, the antennas 142 and 144 may be included in a transceiver module of the UE 14.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 12, other UEs, etc.).

Although not illustrated in FIG. 1, the UEs 14 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 14_1) in detail, each of the UEs 14_2, . . . , 14_N may have a structure that is at least in part similar to that of the UE 14_1. For example, similar to the UE 14_1, each of the UEs 14_2, . . . , 14_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 14_1, . . . , 14_N, a subset of the UEs 14_1, . . . , 14_N, or each of the UEs 14_1, . . . , 14_N. For example, a network setting of the plurality of network settings may specify a maximum bit rate at which a UE (or each of the UEs 14_1, . . . , 14_N) may transmit data to the BS 12. Another network setting of the plurality of network settings may specify a transmit time interval (tti) used by each of the UEs 14_1, . . . , 14_N to transmit data to the BS 12. Yet another network setting of the plurality of network settings may specify a maximum power that each of the UEs 14_1, . . . , 14_N may use to transmit data to the BS 12. The plurality of network settings maintained by the network settings module 130 may also include any other appropriate type of network settings.

In an embodiment, one or more of the plurality of network settings maintained by the network settings module 13 may be communicated to the UEs 14_1, . . . , 14_N (e.g., by the transmit antennas 122 to the receive antennas 144 of the UEs 14_1, . . . , 14_N). Based on receiving the network settings, the UEs 14_1, . . . , 14_N (e.g., the corresponding configuration modules 148) may configure themselves and communicate with the BS 12 accordingly.

Generally, the network 10 is made up of multiple macro cells 16. Thus, depending on the configuration and size, the network 10 can represent and serve various regional areas, e.g., a city, a state, an entire nation, the whole world, etc.

In embodiments, a counter 132 is located within an application server (AS) 134. In an embodiment, as the application server 134 is a telephony application server (TAS). The application server can also be located within the OSS server 18 or the RNC 20. The network 10 may include multiple application servers 134, and therefore multiple counters 132. Furthermore, each application server 134 may include more than one counter 132 to help keep track of various parameters. The application server(s) 134 can also be located outside the network 10.

The UEs 14 generally access or connect to the network 10 by a registration process. Likewise, the UEs 14 exit the network 10 by a de-registration process. However, sometimes the UEs 14 are involuntarily disconnected or dropped from the network 10. In order to monitor the quality and health of the network 10, a network or service leakage rate is monitored, where the network or service leakage rate represents the rate at which UEs 14 are involuntarily disconnected from the network 10.

In accordance with an embodiment, a leakage rate formula is represented by Eq. 1:

$$(\text{Sub\_count\_T2} - \text{Sub\_count\_T1} - (\text{InitReg\_Attempts} * \text{Reg\_SR} - \text{DeReg\_Attempts})) / \text{Sub\_count\_T1} \qquad \text{Eq. 1}$$

Sub_count_T1 and Sub_count_T2 are the registered subscriber count measured at 2 consecutive times T1 and T2 separated by a time interval Ti=T2−T1. InitReg_Attempts is the (cumulated) number of Initial Registration attempts counted between T2 and T1. DeReg_Attempts is the (cumulated) number of De-Registration attempts counted between T2 and T1. Reg_SR is the Success Rate for the Initial Registration Attempt (in %) and thus is the number of successful initial registration attempts between the second point in time and the first point in time divided by the number of user initial registration attempts between the second point in time and the first point in time. The number of successful initial registrations can be defined as the number of positive responses sent back by the network to the subscribers' initial registration requests. Initial registration attempts distinguish from "refresh" registration attempts. For example, in an IMS network the users who are already registered on the IMS network send "refresh register" on a regular basis (time interval is dictated by the network), similarly to a "keep alive" procedure, whereas the "initial register" is the procedure to connect the users (who are not already registered on the IMS network) to the IMS network. Reg_SR is represented by Eq. 2:

$$[\text{InitReg\_Attempts} - \text{number\_of\_unsuccessful\_Initial Registrations}] / \text{InitReg\_Attempts}) \qquad \text{Eq. 2}$$

Thus, in an embodiment, at a first point in time T1, the number of UEs 14 on the network 10 (Sub_count_T1) is determined using one or more of the counters 132. At a second point in time T2, the number of UEs 14 on the network 10 (Sub_count_T2) is again determined using one or more of the counters 132. During the time period between the T1 and T2, one or more of the counters 132 also determine the number of UEs 14 that attempted to access the network 10 (InitReg_Attempts) and the number of UEs 14 that were successful in accessing the network 10 (number_of_successful_Initial Registrations). Finally, one or more of counters 132 also determine a number of UEs 14 that attempted to exit the network 10 (DeReg_Attempts).

Thus, using Eqs. 1 and 2, in order to determine the leakage rate, the number of UEs 14 at the second point in time is subtracted from the number of UEs 14 at the first point in time to provide a first result. The number of UEs 14 initial attempts to access the network 10 is multiplied by the success rate and then the number of UEs 14 leaving the network 10 (de-registering from the network 10 or handing off to a different network) is subtracted to provide a second result. The second result is subtracted from the first result and then divided by the number of UEs 14 at the first point in time. The absolute value provided by the leakage rate formula (Eq.1) is the network leakage rate.

The leakage rate formula (Eq. 1) can be calculated by the application server(s) 134 or other server(s) or processor(s). Additionally, the leakage rate formula (Eq. 1) assumes that the network 10 does not create duplicate registered UEs 14 for the UEs 14 who have lost connection to the network 10 and then successfully reconnect to the network 10. The formula also assumes that the counters 132 keeping track of the various numbers are accurate. Ideally, the result of the formula would be zero, which indicates that there is no change in the network 10, i.e. no leakage. Otherwise, the formula should produce a negative value, i.e., the value of the formula should be less than zero (hence the absolute value of the formula is used as the network leakage rate). If the result of the formula is above zero, then this indicates that there is an issue with the counters 132.

The leakage rate formula (Eq.1) can be used with the various wireless communication network protocols or standards previously mentioned above. Additionally, the leakage rate formula can be used can be used to calculate a leakage rate for services that are based on an IMS network, such as, for example, voice-over LTE (VoLTE), video-over LTE (ViLTE), Wi-Fi calling, rich communication services (RCS) and web RTC. Use of the leakage rate formula as described herein provides real time network health status. Additionally, the leakage rate formula requires very low processing and calculation costs. Additionally, the leakage rate formula allows for finer statistical granularity. For example, in embodiments, the leakage rate can be calculated hourly, every 30 minutes, every 20 minutes, every 15 minutes, every 10 minutes, etc., in order to provide even more accuracy. In other words, the smaller time interval between calculation of the leakage rate, the more accurate the leakage rate information is.

Figure 2:
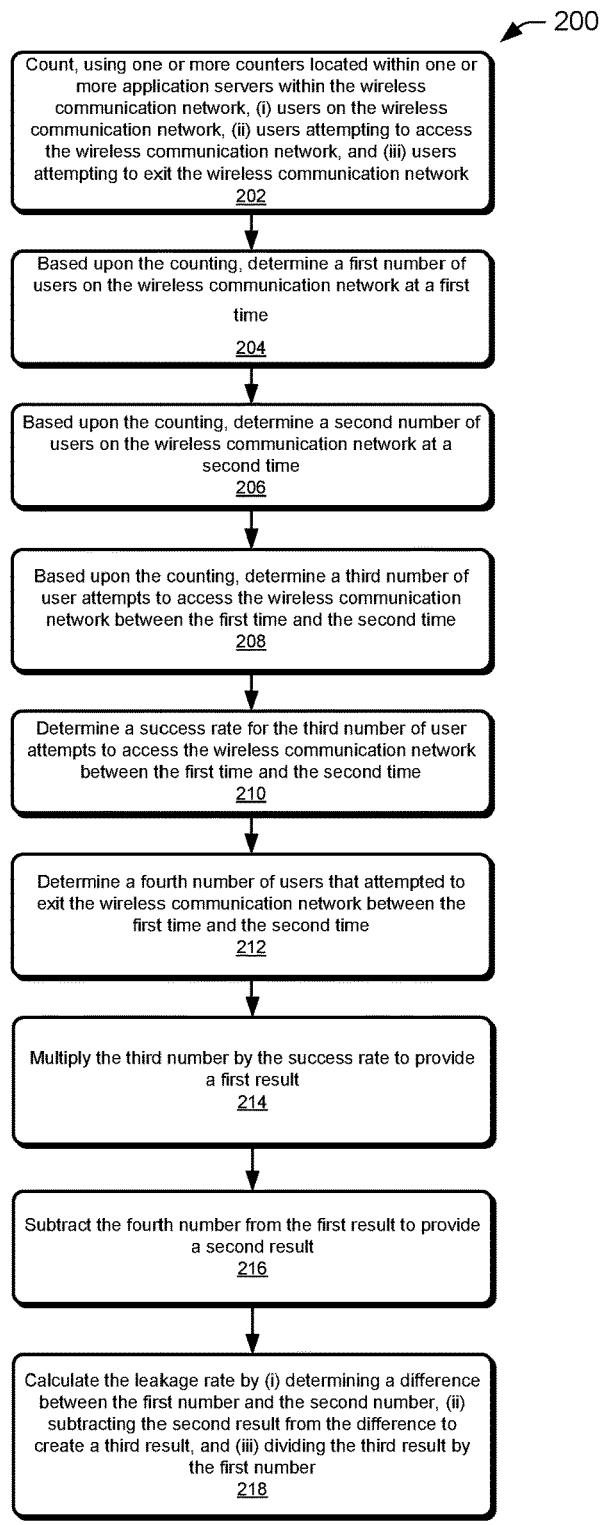
FIG. 2 is a flowchart illustrating a method of calculating a network leakage rate within the wireless communication network of FIG. 1.

FIG. 2 is a flow diagram of an illustrative process that may be implemented within the wireless communication network 10. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 2 is a flowchart illustrating a method 200 of calculating a network leakage rate within a wireless communication network. As illustrated, at block 202, one or more counters located within one or more application servers within the wireless communication network count (i) users on the wireless communication network, (ii) users attempting to access the wireless communication network, and (iii) users attempting to exit the wireless communication network. At block 204, based upon the counting, a first number of users on the wireless communication network at a first time is determined. At block 206, based upon the counting, a second number of users on the wireless communication network at a second time is determined. At block 208, based upon the counting, a third number of user attempts to access the wireless communication network between the first time and the second time is determined. At block 210, a success rate for the third number of user attempts to access the wireless communication network between the first time and the second time is determined. At block 212, a fourth number of users that attempted to exit the wireless communication network between the first time and the second time is determined. At block 214, the third number is multiplied by the success rate to provide a first result. At block 216, the fourth number is subtracted from the first result to provide a second result. At block 218, the leakage rate is calculated by (i) determining a difference between the first number and the second number, (ii) subtracting the second result from the difference to create a third result, and (iii) dividing the third result by the first number.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of determining a leakage rate within a wireless communication network, the method comprising:
   determining (i) a first number of users on the wireless communication network at a first time, (ii) a second number of users on the wireless communication network at a second time, (iii) a third number of users that successfully accessed the wireless communication network between the first time and the second time, and (iii) a fourth number of users that attempted to exit the wireless communication network between the first time and the second time;
   determining a first difference between (i) the first number and (ii) the second number;
   determining a second difference between (i) the third number and (ii) the fourth number; and
   determining the leakage rate by (i) determining a third difference between the first difference and the second difference and (ii) dividing the third difference by the first number.

2. The method of claim 1, wherein the leakage rate is calculated for a region within the wireless communication network.

3. The method of claim 1, wherein the leakage rate is calculated for the entire wireless communication network.

4. The method of claim 1, wherein an amount of time between the first time and the second time is up to one hour.

5. The method of claim 1, wherein determining (i) the first number of users on the wireless communication network at the first time, (ii) the second number of users on the wireless communication network at the second time, (iii) the third number of users that successfully accessed the wireless communication network between the first time and the second time, and (iii) the fourth number of users that attempted to exit the wireless communication network between the first time and the second time comprises:

counting, with one or more counters located within one or more application servers within the wireless communication network, (i) the first number of users on the wireless communication network at the first time, (ii) the second number of users on the wireless communication network at the second time, (iii) the third number of users that successfully accessed the wireless communication network between the first time and the second time, and (iii) the fourth number of users that attempted to exit the wireless communication network between the first time and the second time.

6. The method of claim 5, wherein the one or more application servers are located within the wireless communication network.

7. The method of claim 5, wherein the one or more application servers are located outside the wireless communication network.

8. The method of claim 1, wherein the wireless communication network comprises one of (i) a long-term evolution (LTE) network, (ii) an advanced LTE network, (iii) a global system for mobile communications (GSM) network, (iv) an internet protocol multimedia subsystem (IMS) network, (v) a Universal Mobile Telecommunications System (UMTS) network, or (vi) a Wi-Fi Calling network.

9. An apparatus comprising:
a non-transitory storage medium; and
instructions stored in the non-transitory storage medium, the instructions being executable by the apparatus to:
determine (i) a first number of users on a wireless communication network, (ii) a second number of users on the wireless communication network at a second time, (iii) a third number of users that successfully accessed the wireless communication network between the first time and the second time, and (iv) a fourth number of users that attempted to exit the wireless communication network between the first time and the second time;
determine a first difference between (i) the first number and (ii) the second number;
determine a second difference between (i) the third number and (ii) the fourth number; and
determine a leakage rate by (i) determining a third difference between the first difference and the second difference and (ii) dividing the third difference by the first number.

10. The apparatus of claim 9, wherein the leakage rate is calculated for a region within the wireless communication network.

11. The apparatus of claim 9, wherein the leakage rate is calculated for the entire wireless communication network.

12. The apparatus of claim 9, wherein determine (i) the first number of users on the wireless communication network at the first time, (ii) the second number of users on the wireless communication network at the second time, (iii) the third number of users that successfully accessed the wireless communication network between the first time and the second time, and (iii) the fourth number of users that attempted to exit the wireless communication network between the first time and the second time comprises:

count, with one or more counters, (i) the first number of users on the wireless communication network at the first time, (ii) the second number of users on the wireless communication network at the second time, (iii) the third number of users that successfully accessed the wireless communication network between the first time and the second time, and (iii) the fourth number of users that attempted to exit the wireless communication network between the first time and the second time.

13. The apparatus of claim 12, wherein:
the apparatus comprises an application server located within the wireless communication network; and
the application server comprises the one or more counters.

14. The apparatus of claim 12, wherein:
the apparatus comprises an application server located outside the wireless communication network; and
the application server comprises the one or more counters.

15. The apparatus of claim 9, wherein the wireless communication network comprises one of (i) a long-term evolution (LTE) network, (ii) an advanced LTE network, (iii) a global system for mobile communications (GSM) network, (iv) internet protocol multimedia subsystem (IMS) network, (v) a Universal Mobile Telecommunications System (UMTS) network, or (vi) a Wi-Fi Calling network.

16. A wireless communication network comprising:
an apparatus comprising a non-transitory storage medium and instructions stored in the non-transitory storage medium, the instructions being executable by the apparatus to:
determine (i) a first number of users on the wireless communication network, (ii) a second number of users on the wireless communication network at a second time, (iii) a third number of users that successfully accessed the wireless communication network between the first time and the second time, and (iv) a fourth number of users that attempted to exit the wireless communication network between the first time and the second time;
determine a first difference between (i) the first number and (ii) the second number;
determine a second difference between (i) the third number and (ii) the fourth number; and
determine a leakage rate by (i) determining a third difference between the first difference and the second difference and (ii) dividing the third difference by the first number.

17. The wireless communication network of claim 16, wherein determine (i) the first number of users on the wireless communication network at the first time, (ii) the second number of users on the wireless communication network at the second time, (iii) the third number of users that successfully accessed the wireless communication network between the first time and the second time, and (iii) the fourth number of users that attempted to exit the wireless communication network between the first time and the second time comprises:

count, with one or more counters, (i) the first number of users on the wireless communication network at the first time, (ii) the second number of users on the wireless communication network at the second time, (iii) the third number of users that successfully accessed the wireless communication network between the first time and the second time, and (iii) the fourth number of users that attempted to exit the wireless communication network between the first time and the second time.

18. The wireless communication network of claim 17, wherein:
the apparatus comprises an application server located within the wireless communication network; and
the application server comprises the one or more counters.

19. The wireless communication network of claim 17, wherein:
the apparatus comprises an application server located outside the wireless communication network; and
the application server comprises the one or more counters.

20. The wireless communication network of claim 16, wherein the wireless communication network comprises one of (i) a long-term evolution (LTE) network, (ii) an advanced LTE network, (iii) a global system for mobile communications (GSM) network, (iv) internet protocol multimedia subsystem (IMS) network, (v) a Universal Mobile Telecommunications System (UMTS) network, or (vi) a Wi-Fi Calling network.

* * * * *